(12) United States Patent
Nakajima et al.

(10) Patent No.: US 10,598,268 B2
(45) Date of Patent: Mar. 24, 2020

(54) SUPPORT STRUCTURE OF VEHICLE DRIVE SYSTEM UNIT

(71) Applicant: Toyota Jidosha Kabushiki Kaisha, Toyota-shi (JP)

(72) Inventors: Noritaka Nakajima, Toyota (JP); Hiroshi Kawanishi, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 96 days.

(21) Appl. No.: 15/953,882

(22) Filed: Apr. 16, 2018

(65) Prior Publication Data

US 2018/0297468 A1 Oct. 18, 2018

(30) Foreign Application Priority Data

Apr. 18, 2017 (JP) .................................. 2017-82407

(51) Int. Cl.
| | | |
|---|---|---|
| *F16H 57/03* | (2012.01) | |
| *F16H 57/025* | (2012.01) | |
| *B60K 17/00* | (2006.01) | |

(52) U.S. Cl.
CPC ............. *F16H 57/03* (2013.01); *B60K 17/00* (2013.01); *F16H 57/025* (2013.01); *B60Y 2410/10* (2013.01)

(58) Field of Classification Search
CPC ....... F16H 57/03; F16H 57/025; B60K 17/08; B60K 17/00; B60Y 17/08; B60Y 17/00
USPC .................................................. 180/377, 378
See application file for complete search history.

(56) References Cited

U.S. PATENT DOCUMENTS

| | | | | |
|---|---|---|---|---|
| 3,207,142 A | * | 9/1965 | Gorissen ................ | B60K 17/02 123/195 R |
| 4,779,701 A | * | 10/1988 | Tsuchiya .................. | B60K 5/04 180/292 |
| 5,042,321 A | * | 8/1991 | Hongo .................... | B60K 17/00 74/467 |
| 5,070,830 A | * | 12/1991 | Malven .................. | B60K 17/00 123/195 A |
| 10,295,044 B2 | * | 5/2019 | Wilkins .................. | F16H 57/03 |

(Continued)

FOREIGN PATENT DOCUMENTS

| | | |
|---|---|---|
| JP | 2009-234564 | 10/2009 |
| JP | 2011-140267 | 7/2011 |

(Continued)

*Primary Examiner* — Keith J Frisby
(74) *Attorney, Agent, or Firm* — Oblon, McClelland, Maier & Neustadt, L.L.P.

(57) ABSTRACT

A support structure of a vehicle drive system unit includes a unit case having a plurality of case members provided with abutting portions at axial opening ends, the abutting portions axially abutted against and bolt-fastened to each other to integrally couple the plurality of case members, one of the plurality of case members as a fixing case member being fixed via a supporting member to a body-side supporting portion. In the support structure, a reinforcing stiffener is disposed on the outside of the unit case so as to couple at least one of the abutting portion of the fixing case member and the abutting portion of another case member abutted against and bolt-fastened to the abutting portion of the fixing case member, and the supporting member or the body-side supporting portion to which the supporting member is fixed.

6 Claims, 7 Drawing Sheets

(56) References Cited

U.S. PATENT DOCUMENTS

2011/0163220 A1  7/2011  Ikeda
2014/0245860 A1  9/2014  Kimura et al.

FOREIGN PATENT DOCUMENTS

JP         5741700         7/2015
WO    WO 2013/054450 A1   4/2013

* cited by examiner

SUPPORT STRUCTURE OF VEHICLE DRIVE SYSTEM UNIT

This application claims priority from Japanese Patent Application No. 2017-082407 filed on Apr. 18, 2017, the disclosure of which is herein incorporated by reference in its entirety.

TECHNICAL FIELD

The present invention relates to a vehicle drive system unit and, more particularly, to a support structure fixing to a body-side supporting portion a vehicle drive system unit having a unit case made up of multiple case members.

BACKGROUND ART

A vehicle drive system unit such as a transmission, a transaxle, and a driving power unit generally has a unit case fixed to and supported by a body-side supporting portion via a supporting member. The device described in Patent Document 1 is an example thereof and a driving power unit having an engine and a transmission is fixed to a mount device (body-side supporting portion) via a pair of brackets that are supporting members. Patent Document 1 also describes a technique of fastening these brackets with a stiffener for reinforcement (see paragraph 0005). Patent Document 2 describes a support structure of a transaxle, and a transaxle case thereof has multiple case members (a housing 14, a cylindrical case 16, and a cover 18) axially abutted against and bolt-fastened to each other and fixed to and supported by a mount device on the cover side. Patent Document 3 describes a technique of using a torque rod as a supporting member and providing a stiffener for reinforcing the torque rod.

PRIOR ART DOCUMENTS

Patent Documents

Patent Document 1: Japanese Laid-Open Patent Publication No. 2011-140267
Patent Document 2: Japanese Patent No. 5741700
Patent Document 3: Japanese Laid-Open Patent Publication No. 2009-234564

SUMMARY OF THE INVENTION

Technical Problem

In the case where a unit case is made up of multiple case members such that the case members have opening ends provided with abutting portions such as flanges, and the abutting portions are abutted against each other and bolt-fastened as described in Patent Document 2, when an axial thrust load is generated due to a meshing reaction force of an internal power transmission gear etc., a force in an expanding direction acts on the abutting portions due to the thrust load, and the abutting portions may locally deformed at an intermediate position etc. of bolt-fastened portions in a circumferential direction and may cause oil to seep out.

The present invention was conceived in view of the situations and it is therefore an object of the present invention to restrain oil from locally seeping out from a unit case of a vehicle drive system unit having multiple case members bolt-fastened and integrally coupled.

Solution to Problem

To achieve the above object, a first aspect of the present invention provides a support structure of a vehicle drive system unit including a unit case having a plurality of case members provided with abutting portions at axial opening ends, the abutting portions axially abutted against and bolt-fastened to each other to integrally couple the plurality of case members, one of the plurality of case members as a fixing case member being fixed via a supporting member to a body-side supporting portion, wherein a reinforcing stiffener is disposed on the outside of the unit case so as to couple at least one of the abutting portion of the fixing case member and the abutting portion of another case member abutted against and bolt-fastened to the abutting portion of the fixing case member, and the supporting member or the body-side supporting portion to which the supporting member is fixed.

A second aspect of the present invention provides the support structure of a vehicle drive system unit recited in the first aspect of the invention, wherein the stiffener includes a first reinforcing coupling portion fixed to the abutting portion as well as a second reinforcing coupling portion fixed to a part of the unit case other than the abutting portions.

A third aspect of the present invention provides the support structure of a vehicle drive system unit recited in the first or second aspect of the invention, wherein the stiffener is coupled to the abutting portion that is a fastening flange projected from the opening end of the case member to the outer circumferential side of the case member.

A fourth aspect of the present invention provides the support structure of a vehicle drive system unit recited in any one of the first through third aspects of the invention, wherein the stiffener couples the abutting portion of the fixing case member and the supporting member or the body-side supporting portion to which the supporting member is fixed.

A fifth aspect of the present invention provides the support structure of a vehicle drive system unit recited in any one of the first through third aspects of the invention, wherein the stiffener couples the abutting portion of the other case member and the supporting member or the body-side supporting portion to which the supporting member is fixed.

A sixth aspect of the present invention provides the support structure of a vehicle drive system unit recited in any one of the first through fifth aspects of the invention, the vehicle drive system unit is a transaxle for a front-drive vehicle including a plurality of rotation shafts arranged in a vehicle width direction and a differential gear device disposed in the unit case to distribute power to right and left front wheels.

Advantageous Effects of Invention

In the support structure of the vehicle drive system unit as described above, since the stiffener is disposed so as to couple at least one of the abutting portion of the fixing case member and the abutting portion of another case member abutted against and bolt-fastened to the abutting portion, and the supporting member or the body-side supporting portion, the strength of support of the vehicle drive system unit by the supporting member is reinforced by the stiffener, and the support strength of the vehicle drive system unit is improved. Since the stiffener is coupled to the abutting portion, the stiffness of the abutting portion is locally increased, and oil is restrained from seeping out due to deformation of the abutting portion in the expanding direction.

According to the second aspect of the invention, since the stiffener includes the first reinforcing coupling portion fixed to the abutting portion as well as the second reinforcing coupling portion fixed to a part of the unit case other than the abutting portion, the connecting positions of these reinforcing coupling portions can individually be set to appropriate positions, and the oil can appropriately be restrained from locally seeping out from the abutting portion while properly reinforcing the strength of support by the supporting member. The reinforcement with the second reinforcing coupling portion can also locally increase the stiffness of the unit case so as to improve a performance against noises and vibrations (NV performance).

The third aspect of the invention is the case where the stiffener is coupled to the abutting portion that is a fastening flange disposed to project from the opening end of the case member to the outer circumferential side of the case member. Thus, the root portion of the fastening flange (the L-shaped portion on the inner circumferential side) is easily deformed by the thrust load and the amount of deformation in the expanding direction is made larger and likely to cause the problem of the seeping oil; however, since the stiffener is coupled to the fastening flange, an expanding deformation is suppressed so that the oil can appropriately be restrained from seeping out due to the expanding deformation.

According to the fourth aspect of the invention, since the stiffener is coupled to the abutting portion of the fixing case member fixed to the body-side supporting portion via the supporting member, variation is suppressed in the coupling position of the stiffener (the position of a threaded hole etc.), so that assembly distortion is reduced and the function of the stiffener as a reinforcing member is properly provided.

In the fifth aspect of invention, since the stiffener is coupled to the abutting portion of the other case member abutted against and bolt-fastened to the abutting portion of the fixing case member, the stiffness of the abutting portion of the other case member can be increased to properly restrain oil from seeping out due to the deformation even when the abutting portion of the other case member is relatively largely deformed in the expanding direction due to a reinforcing rib etc.

The sixth aspect of the invention is the case where the vehicle drive system unit is a transaxle for a front-drive vehicle and, although an axial thrust load is generated due to a meshing reaction force of an internal power transmission gear etc. and the force in the expanding direction acts on the abutting portions due to the thrust load and may cause oil to locally seep out, the stiffener is coupled to the abutting portion so that the oil can be restrained from seeping out while the support strength of the transaxle is improved.

MODES FOR CARRYING OUT THE INVENTION

Figure 1:
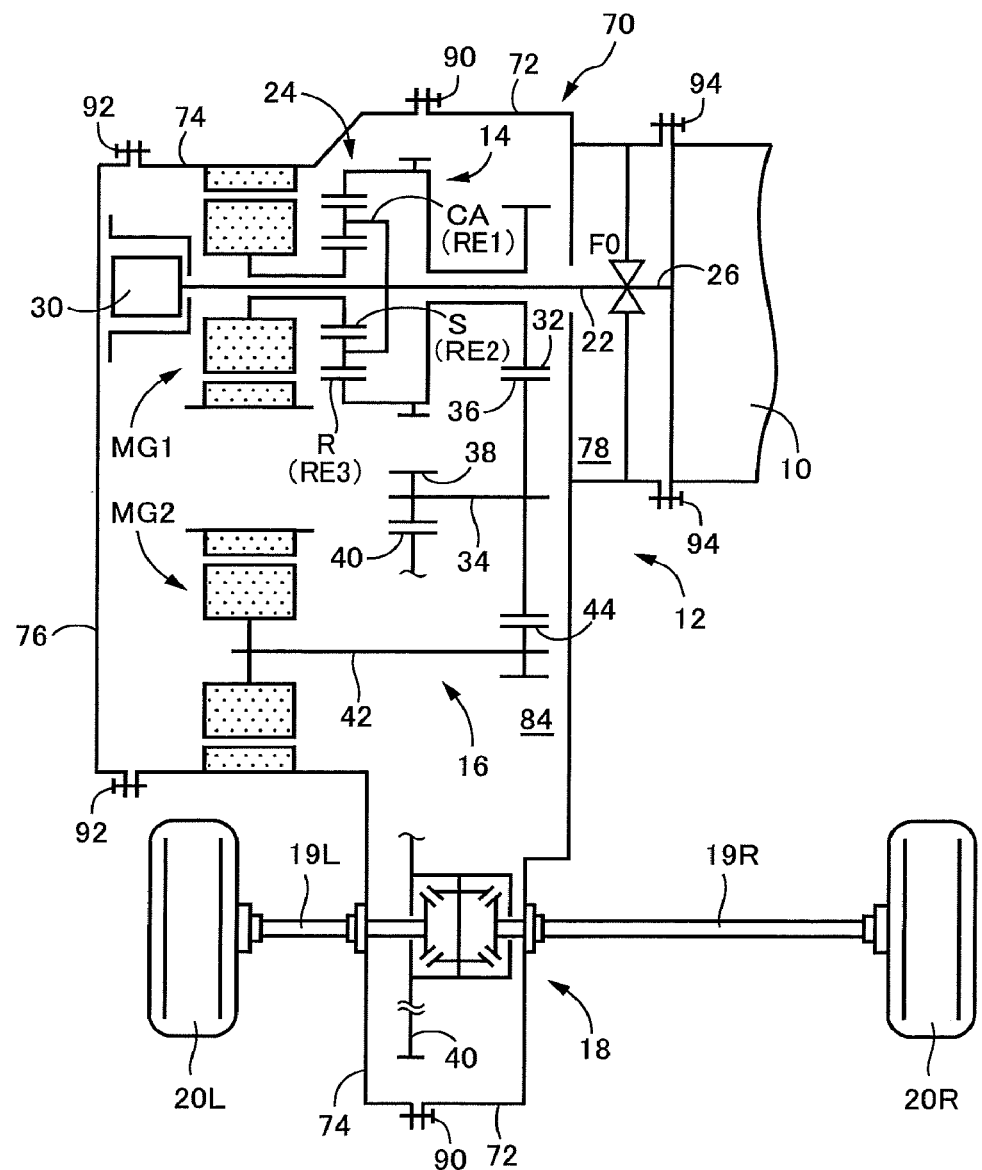
FIG. 1 is a skeleton diagram illustrating a configuration of a power transmission device for a vehicle including a support structure to which the present invention is applied.

The present invention is applied to a support structure of a transaxle for a front-wheel-drive vehicle, for example, and may also be applied to support structures of other vehicle drive system units such as a transmission and a driving power unit. Abutting portions provided at opening ends of multiple case members are portions provided with insertion holes through which fastening bolts are inserted and threaded holes into which the fastening bolts are screwed and are fastening flanges provided to project from the opening ends to the outer circumferential side, for example; however, axial opening ends of cylindrical case members can directly be used as the abutting portions by increasing the thickness and providing the threaded holes. The fastening flanges may be provided in the abutting portions of some of the multiple case members.

For a body-side supporting portion, for example, a mount device having an elastic body such as rubber or a fluid built-in for absorbing vibrations and shocks is suitably used, or a suspension member etc. of a vehicle may also be used. A supporting member fixing a fixing case member to the body-side supporting portion is a member for supporting the entire vehicle driving system unit, such as a bracket and a torque rod, for example, and multiple supporting members are typically used. A stiffener is for locally increasing strength and stiffness and is additionally or supplementarily provided as necessary. For the stiffener, for example, a light and highly-rigid round pipe is suitably used, or a solid round bar, a square bar, etc. can also be used. Although the stiffener is configured to include, for example, a first reinforcing coupling portion fixed to the abutting portion for preventing oil from seeping out and a second reinforcing coupling portion fixed to a part other than the abutting portion for reinforcement of support strength etc., a single reinforcing coupling portion fixed to the abutting portion can solely restrain oil from seeping out and reinforce the support strength. The second reinforcing coupling portion is coupled to the fixing case member fixed to the body-side supporting portion via a supporting member, for example, or can also be coupled to a case member other than the fixing case member.

The stiffener may be coupled to one of the paired abutting portions abutted against and bolt-fastened to each other, or can be coupled to both of the paired abutting portions. When the stiffener is coupled to one of the paired abutting portions, the stiffener is preferably coupled to an abutting portion a deformation amount of which is larger than that of the other abutting portion; however, even if the stiffener is coupled to an abutting portion a deformation amount of which is smaller than that of the other abutting portion due to a restriction on coupling thereof etc., an oil seeping restraining effect is acquired.

Examples

Examples of the present invention will now be described in detail with reference to the drawings. In the following examples, the figures are simplified or defaulted as needed for description and portions are not necessarily precisely drawn in terms of dimension ratio, shape, etc.

FIG. 1 is a skeleton diagram illustrating a configuration of a power transmission device for a hybrid vehicle (hereinafter simply referred to as a power transmission device) including a support structure of an example of the present invention. The power transmission device is suitably used in an FF (front engine front wheel drive) vehicle and is configured to include an engine 10 as a drive power source (main power source), and a transaxle 12 distributing an output of the engine 10 via left and right axles 19L, 19R to left and right front wheels (drive wheels) 20L, 20R. The engine 10 is an internal combustion engine such as a gasoline engine or a diesel engine generating a drive power by combustion of fuel injected in a cylinder, for example. The transaxle 12 includes a first drive portion 14, a second drive portion 16, and a differential gear device 18 as a power transmission mechanism, and the first drive portion 14, the second drive portion 16, and the differential gear device 18 are housed in a transaxle case 70. The transaxle 12 is transversely-mounted, i.e., disposed in a posture in which rotation shafts (an input shaft 22, a counter driven shaft 34, an output shaft 42, etc.) are substantially parallel to a vehicle width direction, along with the engine 10 in an engine room disposed in a vehicle front portion. The transaxle 12 corresponds to a vehicle drive system unit, and the transaxle case 70 corresponds to a unit case.

The first drive portion 14 is configured to include a planetary gear device 24 having a sun gear S, a carrier CA, and a ring gear R as three rotating elements, and a first rotating machine MG1 coupled to the sun gear S of the planetary gear device 24. Between a crankshaft 26 serving as an output shaft of the engine 10 and the transaxle case (case member) 70 serving as a non-rotating member, a one-way clutch F0 is disposed which allows the engine 10 to rotate in the normal rotation direction and prohibits the engine 10 to rotate in the reverse direction. Therefore, the reverse rotation of the engine 12 is blocked by the one-way clutch F0.

The crankshaft 26 of the engine 10 is coupled to the carrier CA of the planetary gear device 24 via the input shaft 22 of the first drive portion 14. The crankshaft 26 is also coupled to a mechanical oil pump 30. The ring gear R of the planetary gear device 24 serving as an output rotating member is coupled to an output gear 32. The output gear 32 is coupled in a power transmittable manner via the differential gear device 18 and the axles 19L, 19R to the drive wheels 20L, 20R. The carrier CA, which rotates at a speed between those of the ring gear R and the sun gear S in a differential state of the planetary gear device 24, is connected as a first rotating element RE1 to the engine 10, the sun gear S is connected as a second rotating element RE2 to the first rotating machine MG1, and the ring gear R is connected as a third rotating element RE3 to the output gear 32 serving as an output member.

The output gear 32 is meshed with a large diameter gear 36 disposed integrally with the counter driven shaft 34 parallel to the input shaft 22 of the first drive portion 14. A small diameter gear 38 also disposed integrally with the counter driven shaft 34 is meshed with a ring gear 40 of the differential gear device 18. The large diameter gear 36 is meshed with a second output gear 44 coupled to the output shaft 42 of a second rotating machine MG2 functioning as a driving electric motor. Therefore, the second rotating machine MG2 is coupled in a power transmittable manner to the drive wheels 20L, 20R. Preferably, both the first rotating machine MG1 and the second rotating machine MG2 are configured as motor generators having functions of a motor generating a drive power and a generator generating a reaction force.

Figure 2:
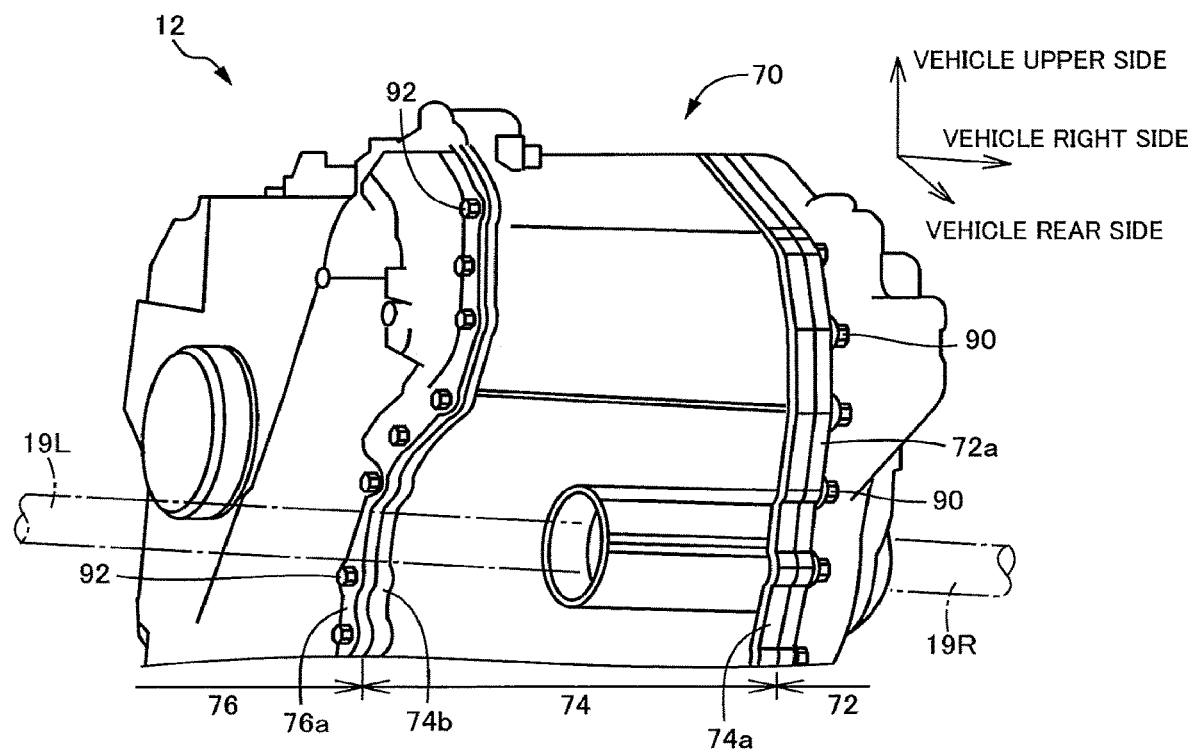
FIG. 2 is a schematic perspective view of an external shape of the transaxle shown in FIG. 1.

The transaxle 12 as described above includes the transaxle case 70 housing the functional components therein and integrally fixed to the engine 10. FIG. 2 is a schematic perspective view of an external shape of the transaxle 12, i.e., an external shape of the transaxle case 70. This transaxle case 70 is made up of three case members, i.e., a housing 72, a case 74, and a rear cover 76, each provided with fastening flanges 72a, 74a, 74b, 76a at axial opening ends, such that each of fastening flanges 72a, 74a, 74b, 76a projects toward the outer circumferential side. The fastening flange 72a of the housing 72 and the fastening flange 74a on the front side of the case 74, i.e., on the engine 10 side and on the vehicle right side, are axially abutted against each other and bolt-fastened by a multiplicity of fastening bolts 90, while the fastening flange 74b on the rear side of the case 74 and the fastening flange 76a of the rear cover 76 are axially abutted against each other and bolt-fastened by a multiplicity of fastening bolts 92, so that the housing 72, the case 74, and the rear cover 76 are integrally coupled to constitute the transaxle case 70. The fastening flange 72a is provided with insertion holes for inserting the fastening bolts 90, and the fastening flange 74a is provided with threaded holes to which the fastening bolts 90 are screwed. The fastening flange 76a is provided with insertion holes for inserting the fastening bolts 92, and the fastening flange 74b is provided with threaded holes to which the fastening bolts 92 are screwed.

As shown in FIG. 1, the housing 72 is integrally fixed to the engine 10 by bolts 94, and a first housing space 78 housing the one-way clutch F0 is formed between the housing 72 and the engine 10. The cylindrical case 74 forms a second housing space 84 housing the first drive portion 14, the second drive portion 16, the differential gear device 18, etc.

Figure 5:
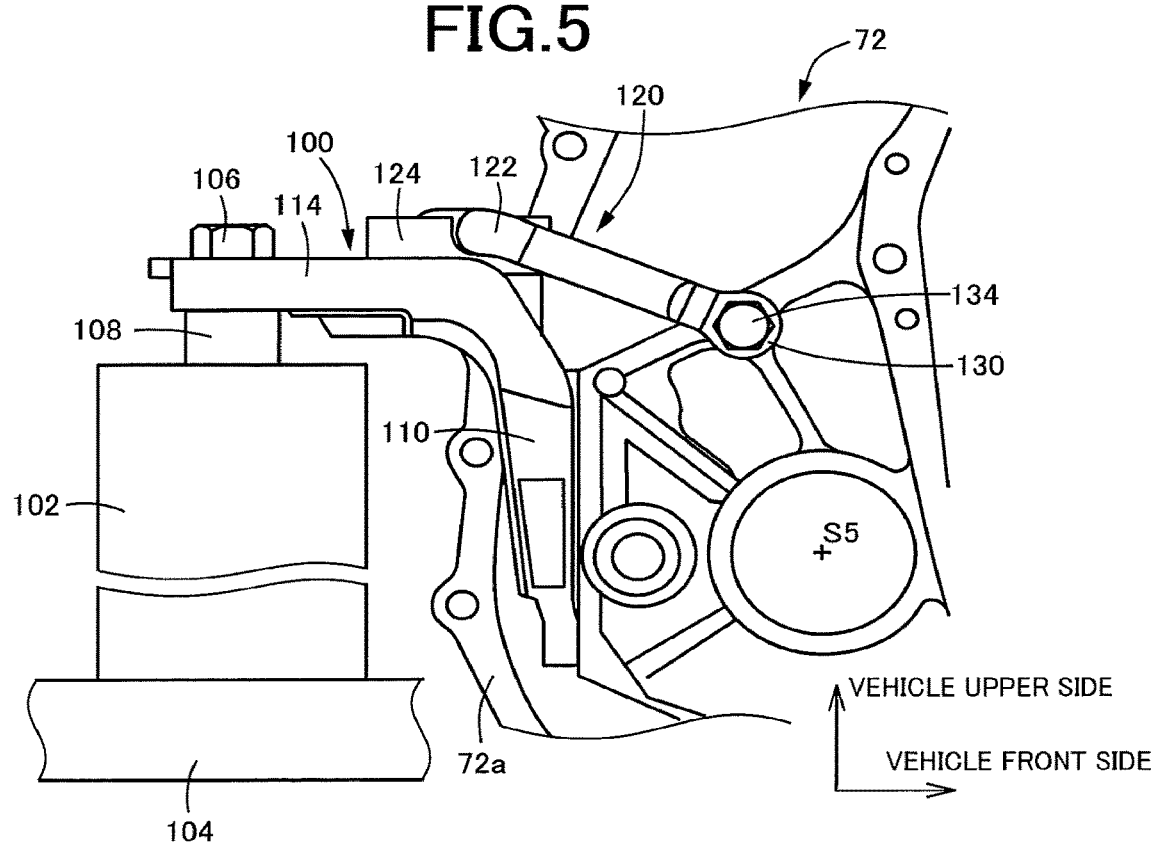
FIG. 5 is an enlarged side view, i.e., a view from the right hand of the vehicle (the right hand of FIG. 4), of a portion of the housing of FIG. 3 at which the bracket and the stiffener are disposed, showing a state in which the bracket is fixed to a mount device.

The transaxle case 70 is fixed to and supported by a mount device 102 that is a body-side supporting portion via a bracket 100 fixedly disposed on the housing 72 as shown in FIG. 5, for example. The bracket 100 corresponds to a supporting member and is disposed at a plurality of positions of the transaxle case 70 as needed and fixed to the body-side supporting portion such as the mount device. The mount device 102 has an elastic body such as rubber or a fluid built-in for absorbing vibrations and shocks, is disposed on a vehicle body 104 such as a frame and a suspension member, and includes a bracket coupling portion 108 to which the bracket 100 is fixed by a bolt 106.

Figure 3:
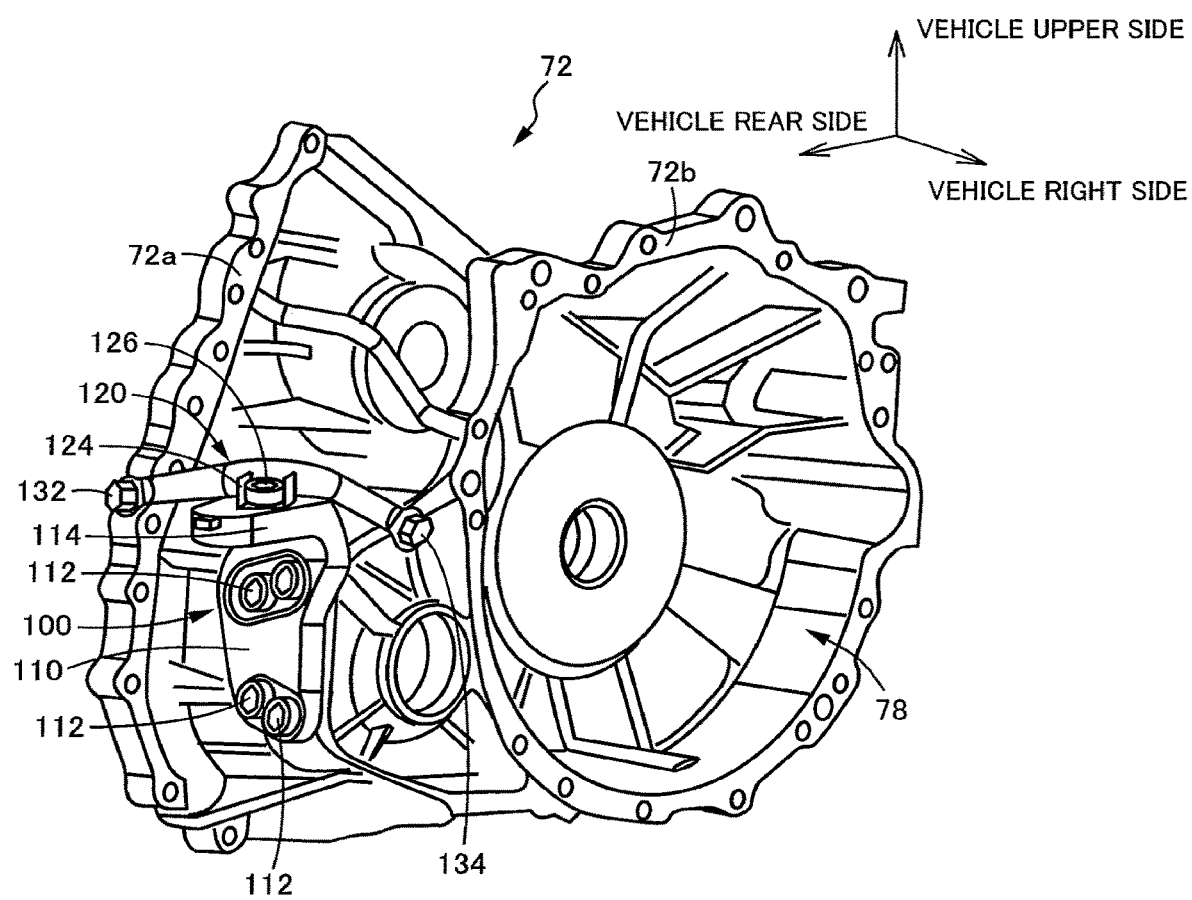
FIG. 3 is a perspective view of a housing of a transaxle case, showing a state in which a bracket and a stiffener are attached.
Figure 4:
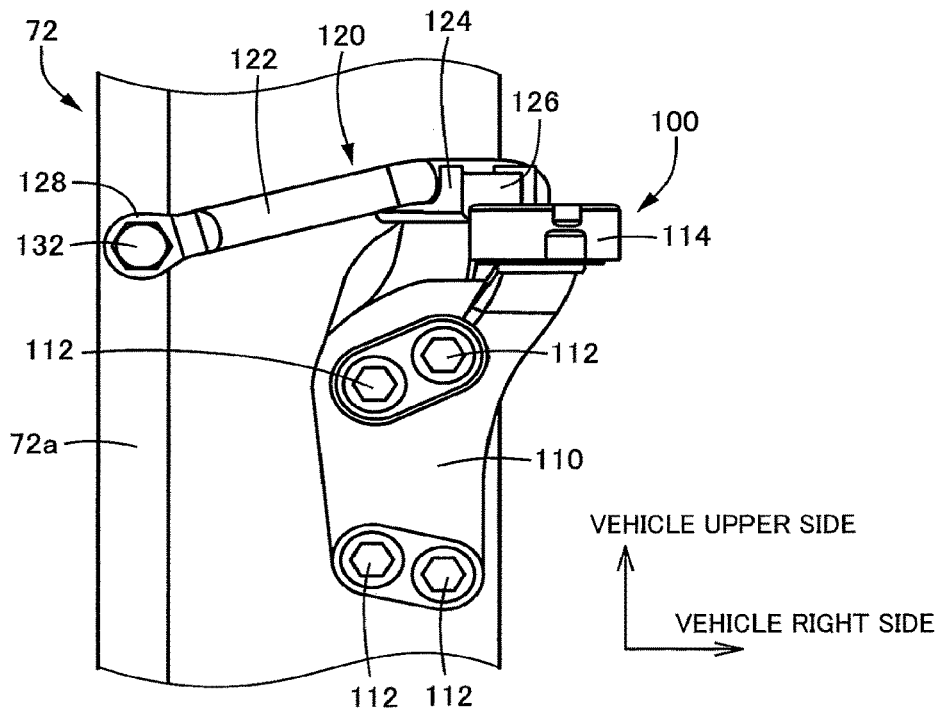
FIG. 4 is an enlarged front view, i.e., a view from the vehicle rear side, of a portion of the housing of FIG. 3 at which the bracket and the stiffener are disposed.

FIG. 3 is a schematic perspective view of the housing 72 to which the bracket 100 is fixed, and FIG. 4 is a front view of the housing 72 viewed from the vehicle rear side in a vehicle mounted state. FIG. 5 is a side view of the housing 72 viewed from the vehicle right side (the right hand of FIG. 4) in the vehicle mounted state, showing a structure of support by the mount device 102 together. An end surface 72b of the housing 72 of FIG. 3 is an abutting surface abutted against and fixed to the engine 10, and the first housing space 78 is formed therein. As is clear from these figures, the bracket 100 has an inverted L shape as a whole, and a case fixing portion 110 extending in the vertical direction is integrally fixed to an outer wall of the housing 72 by multiple (in the example, four) bolts 112. A substantially horizontal mount coupling portion 114 substantially orthogonally bent from the upper end of the case fixing portion 110 in a direction away from the housing 72 is fixed to the bracket coupling portion 108 of the mount device 102 by the bolt 106. The bracket 100 has a partially box-shaped hollow structure so that a predetermined strength can be achieved. The housing 72 corresponds to a fixing case member fixed to the mount device 102 via the bracket 100.

Figure 6:
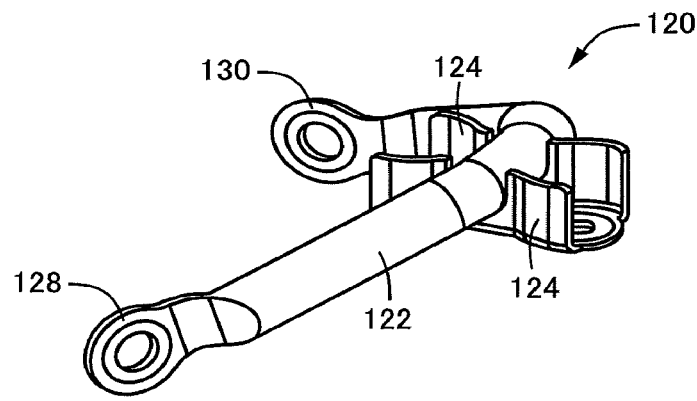
FIG. 6 is a perspective view of a stiffener shown alone.

A stiffener 120 is fixedly disposed on the bracket 100 so as to locally increase the strength and stiffness of the transaxle case 70 and locally reinforce the support strength of the transaxle 12. FIG. 6 is a perspective view of the stiffener 120 shown alone, and an intermediate portion of a cylindrical member 122 having cylindrical structure such as a pipe is bent by substantially 90° into an L-shape. In the vicinity of a bent portion of the intermediate portion, a separately formed mounting metal fitting 124 having a U-shaped cross section is integrally fixed to the cylindrical member 122 by welding etc., and the stiffener 120 is integrally fixed to the mount coupling portion 114 of the bracket 100 via the mounting metal fitting 124 by bolts 126 (see FIGS. 3 and 4). The mounting metal fitting 124 is disposed to project substantially symmetrically on both sides of the cylindrical member 122 and is fixedly disposed on the bracket 100 by a pair of the bolts 126.

Both end portions of the cylindrical member 122 are flattened and provided with bolt insertion holes such that a first reinforcing coupling portion 128 and a second reinforcing coupling portion 130 are formed. The first reinforcing coupling portion 128 is fixed to an outer circumferential surface of the fastening flange 72a by a bolt 132, thereby locally increasing the stiffness of the fastening flange 72a so as to suppress deformation and to restrain oil from seeping out due to the deformation. Specifically, the transaxle case 70 supports the rotation shafts such as the input shaft 22 rotatably and in a positioning manner in an axial direction and, if a thrust load is generated due to a meshing reaction force of a power transmission gear such as a helical gear, forces Fa (see FIG. 7) act in directions away from each other on abutting portions of the housing 72 and the case 74, i.e., the fastening flanges 72a and 74a respectively, and locally deform the fastening flange 72a in an expanding direction of the housing 72 and the case 74 in the vicinity of a part where the thrust load is applied, so that oil may seep out. Since the fastening flange 72a is provided to project from the opening end of the housing 72 to the outer circumferential side, a root portion (an L-shaped portion on the inner peripheral side) of the fastening flange 72a is easily deformed and increased in deformation amount in the expanding direction, highly possibly causing a problem of seeping oil. In this example, the deformation amount on the fastening flange 72a side is larger than the fastening flange 74a due to a presence of a reinforcing rib etc., and the stiffener 120 is coupled to the fastening flange 72a to suppress the deformation, and the first reinforcing coupling portion 128 is coupled to a part in which a large deformation amount may cause oil to seep out. In other words, the length, shape, etc. of the cylindrical member 122 are determined according to a part of coupling. Additionally, coupling the stiffener 120 to the fastening flange 72a reinforces the strength of support of the transaxle 12 by the bracket 100 and suppresses the displacement, deformation, etc. of the transaxle 12.

On the other hand, the second reinforcing coupling portion 130 is fixed to a predetermined part excluding the fastening flange 72a of the housing 72 by a bolt 134. The part of the housing 72 to which the second reinforcing coupling portion 130 is fixed is defined at a position at which the overall strength of support of the transaxle 12 by the bracket 100 can properly be reinforced, for example, and the overall strength of support of the transaxle 12 by the bracket 100 is reinforced in conjunction with coupling of the first reinforcing coupling portion 128 to the fastening flange 72a. Additionally, since various vibrations are transmitted to the transaxle case 70 from meshing portions of the power transmission gears etc., and the transaxle case 70 may locally vibrate to impair NV performance, the second reinforcing coupling portion 130 can be coupled to a part to which vibrations are transmitted to increase the stiffness of the part, thereby suppressing the vibrations and improving the NV performance.

Figure 7:
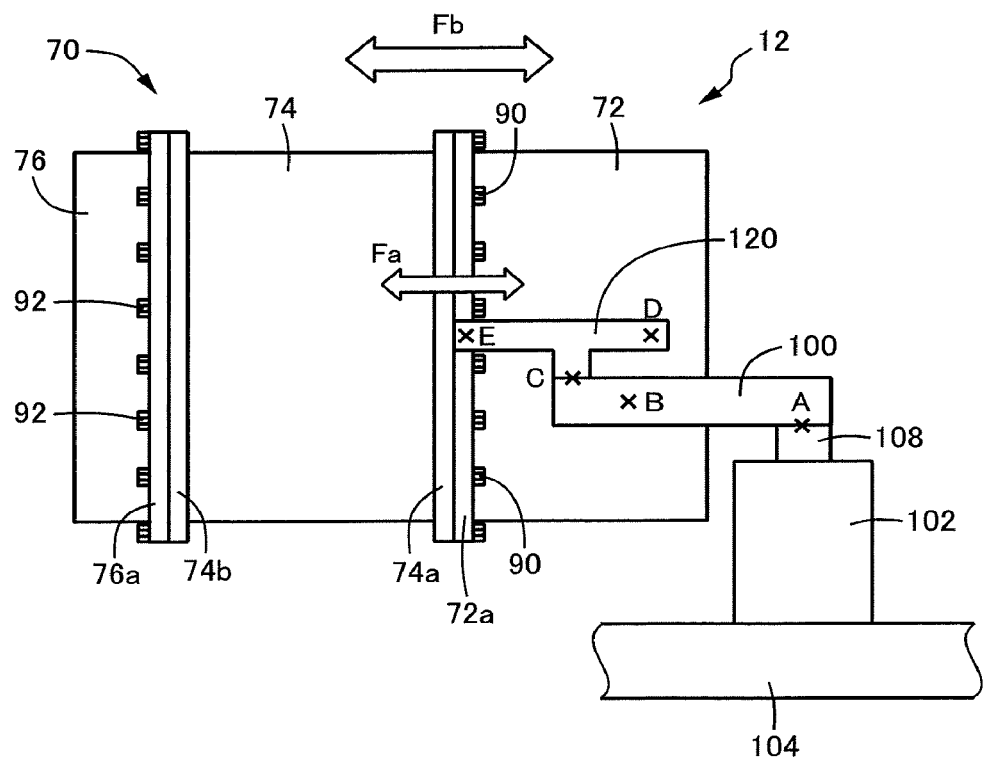
FIG. 7 is a conceptual diagram of the support structure of the transaxle in the examples of FIGS. 1 to 6.

FIG. 7 is a conceptual diagram of the support structure of the transaxle 12 of this example, wherein multiple "x" marks are each indicative of a coupling portion, and a coupling portion A corresponds to the bolt 106 fixing the bracket 100 to the bracket coupling portion 108 of the mount device 102. A coupling portion B corresponds to the bolt 112 fixing the bracket 100 to the housing 72; a coupling portion C corresponds to the bolt 126 fixing the stiffener 120 to the bracket 100; a coupling portion D corresponds to the bolt 134 fixing the second reinforcing coupling portion 130 of the stiffener 120 to the housing 72; and a coupling portion E corresponds to the bolt 132 fixing the first reinforcing coupling portion 128 of the stiffener 120 to the fastening flange 72a of the housing 72. An outlined arrow Fa indicates a force in the expanding direction acting between the fastening flanges 72a, 74a due to a thrust load etc. resulting from a meshing reaction force of a power transmission gear such as a helical gear and, since the stiffener 120 is coupled to the fastening flange 72a at the coupling portion E, the fastening flange 72a is restrained from deforming in the expanding direction. Since the stiffener 120 is coupled to the transaxle case 70 at the coupling portions D and E, the support strength of the transaxle case 70 is reinforced, so that the transaxle 12 is restrained from displacing, deforming, etc. caused by a load Fb applied to the transaxle 12 due to vibratory input etc. from a road surface, for example. Therefore, if a support strength provided by the bracket 100 alone is insufficient due to restriction on mounting on the vehicle etc., a predetermined support strength can be ensured by further using the stiffener 120. Depending on the position of the coupling portion D of the stiffener 120, the stiffness of the housing 72 can locally be increased to suppress vibrations etc. and improve the NV performance. Although the transaxle 12 is integrally fixed to the engine 10 in the mounted state on the vehicle, the engine 10 is not shown in FIG. 7.

As described above, in the support structure of the transaxle 12 of this example, since the stiffener 120 is disposed to couple the fastening flange 72a of the housing 72 and the bracket 100, the strength of support of the transaxle 12 by the bracket 100 is reinforced by the stiffener 120, and the support strength of the transaxle 12 is improved. Since the stiffener 120 is coupled to the fastening flange 72a, the stiffness of the fastening flange 72a is locally increased, and oil is restrained from seeping out due to deformation of the fastening flange 72a in the expanding direction. Therefore, by using the common stiffener 120, the two functions of reinforcing the support strength of the transaxle 12 and preventing the oil from locally seeping out from the abutting portion of the fastening flange 72a can conveniently be implemented while suppressing increases in mass and cost.

Since the stiffener 120 includes the first reinforcing coupling portion 128 fixed to the fastening flange 72a as well as the second reinforcing coupling portion 130 fixed to a part of the transaxle case 70 other than the fastening flanges, the connecting positions of these reinforcing coupling portions 128, 130 can individually be set to appropriate positions, and the oil can appropriately be restrained from locally seeping out from the abutting portion while properly reinforcing the strength of support by the bracket 100. The reinforcement with the second reinforcing coupling portion 130 can also locally increase the stiffness of the transaxle case 70 so as to improve the NV performance.

Since the stiffener 120 is coupled to the fastening flange 72a disposed to project from the opening end of the housing 72 to the outer circumferential side of the housing 72, the root portion of the fastening flange 72a (the L-shaped portion on the inner circumferential side) is easily deformed by the force Fa in the expanding direction and the amount of deformation in the expanding direction is made larger and likely to cause the problem of the seeping oil; however, since the stiffener 120 is coupled to the fastening flange 72a, an expanding deformation is suppressed so that the oil can appropriately be restrained from seeping out due to the expanding deformation.

Since the stiffener 120 is coupled to the fastening flange 72a of the housing 72 fixed to the mount device 102 via the bracket 100, variation is suppressed in the coupling position of the stiffener 120, i.e., the position of the threaded hole provided in the fastening flange 72a for fixing the first reinforcing coupling portion 128 by the bolt 132, so that assembly distortion is reduced and the function of the stiffener 120 as a reinforcing member is properly provided. Specifically, for example, as shown in FIG. 8, if a stiffener 140 is coupled to the fastening flange 74a of the case 74 (coupling portion F), variation is increased in the coupling position of the stiffener 140 (the position of the threaded hole provided in the fastening flange 74a) due to an assembly error between the case 74 and the housing 72, and therefore, the assembly distortion of the stiffener 140 may become large and impair the function.

This example is the case of application to the support structure of the transaxle 12 and, although an axial thrust load is generated due to a meshing reaction force of an internal power transmission gear etc. and the force Fa in the expanding direction acts on the abutting portions of the fastening flanges 72a, 74a due to the thrust load and may cause oil to locally seep out, the stiffener 120 is coupled to the fastening flange 72a having a large deformation amount so that the oil can be restrained from seeping out while the support strength of the transaxle 12 is improved.

Other examples of the present invention will be described. In the following examples, the portions substantially common to the example described above are denoted by the same reference numerals and will not be described in detail.

Figure 8:
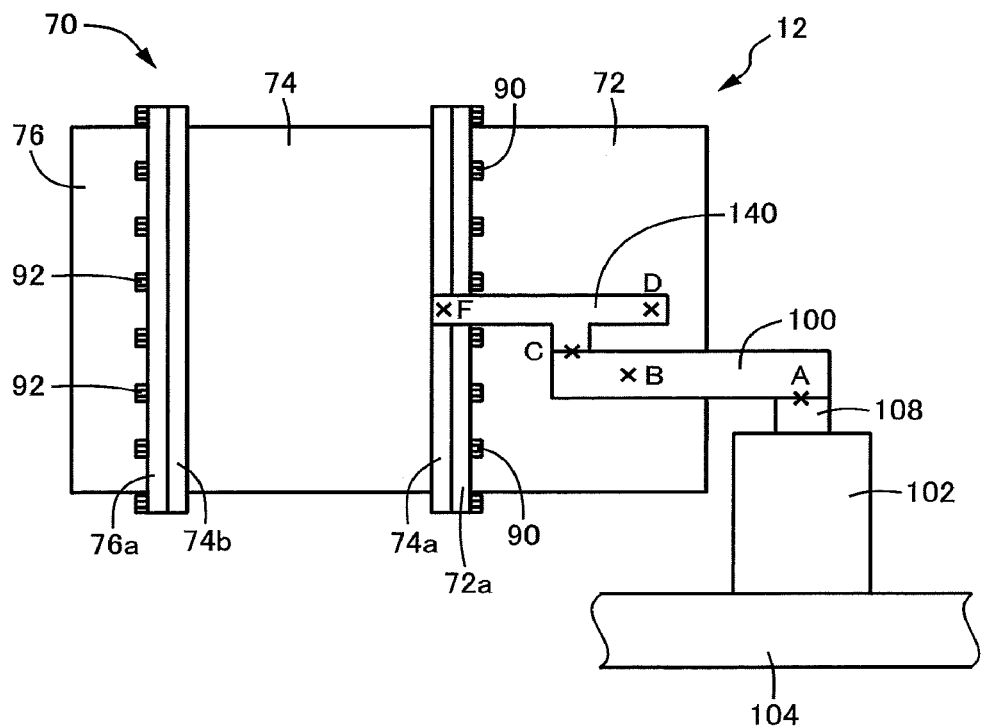
FIG. 8 is a conceptual diagram corresponding to FIG. 7 for explaining another example of the present invention.
Figure 9:
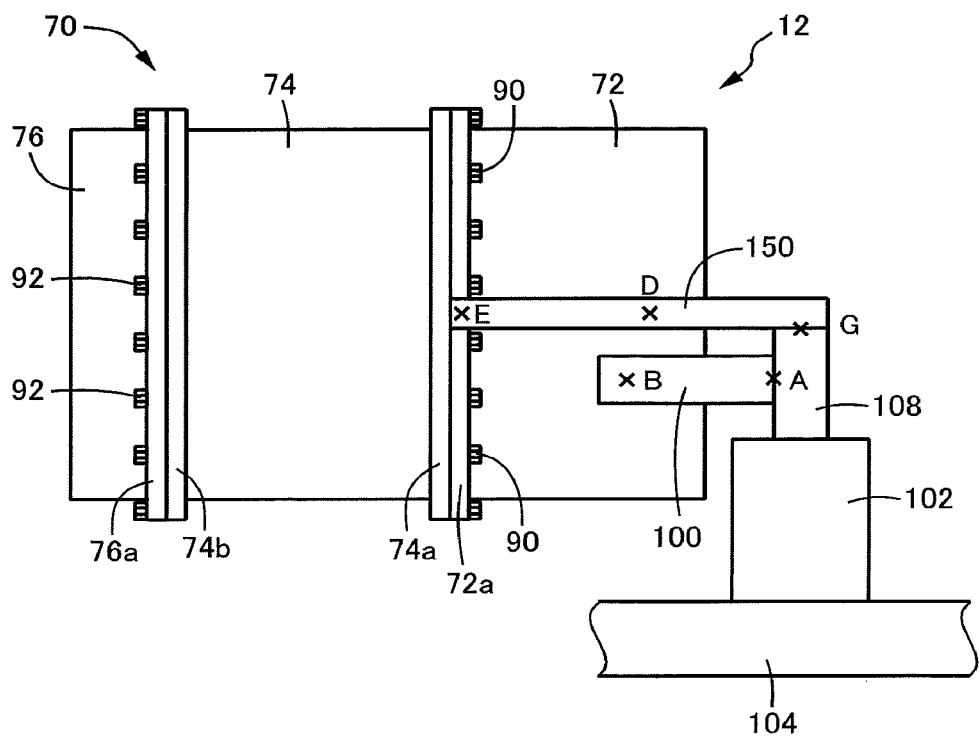
FIG. 9 is a conceptual diagram corresponding to FIG. 7 for explaining still another example of the present invention.
Figure 10:
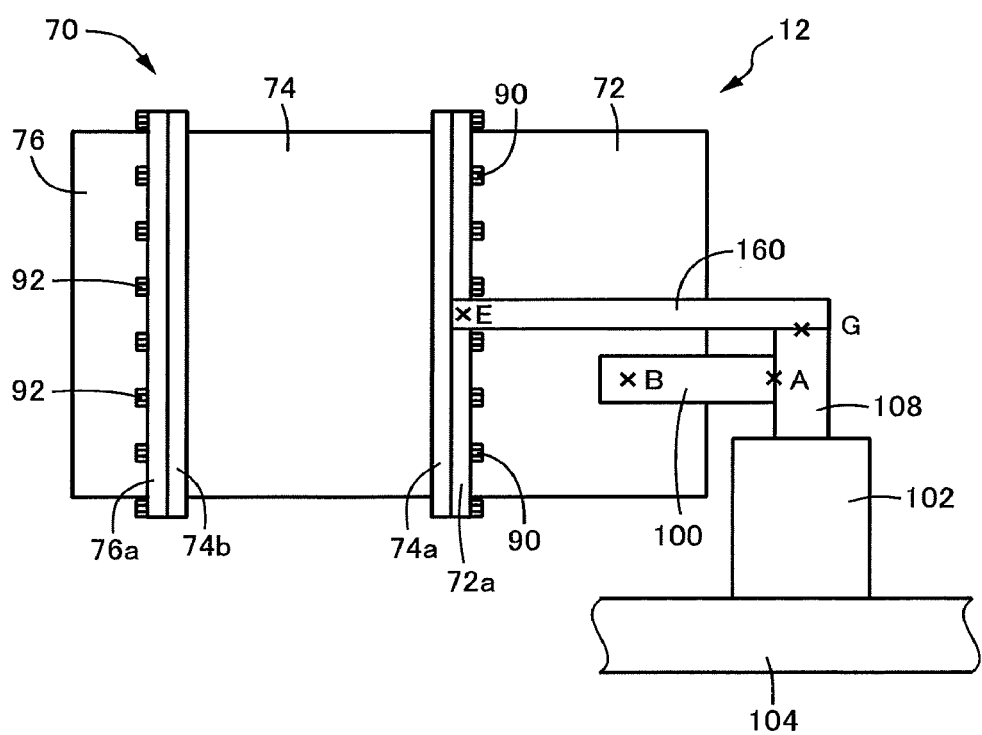
FIG. 10 is a conceptual diagram corresponding to FIG. 7 for explaining still another example of the present invention.

FIGS. 8 to 10 are all conceptual diagrams of the support structure of the transaxle 12 corresponding to FIG. 7 described above. The stiffener 140 of FIG. 8 is different from the stiffener 120 in that one reinforcing coupling portion (the first reinforcing coupling portion) is coupled to the fastening flange 74a of the case 74 at the coupling portion F. Specifically, this is the case that the deformation amount on the fastening flange 74a side is larger than that on the fastening flange 72a side due to a presence of a reinforcing rib etc., and the stiffener 140 is coupled to the fastening flange 74a so that the stiffness of the fastening flange 74a is locally increased while the support strength of the transaxle 12 is improved and the occurrence of seeping oil is suppressed. The stiffener 140 can be coupled to both of the fastening flanges 72a and 74a.

A stiffener 150 of FIG. 9 is different from the stiffener 120 in that the stiffener 150 is directly fixed to the bracket coupling portion 108 of the mount device 102 at the coupling portion G instead of the bracket 100. In this case, the same effect as the stiffener 120 can be acquired and, since the stiffener 150 is directly fixed to the mount device 102 and a degree of freedom is increased in terms of setting of the coupling portions D, E, the support strength of the transaxle 12 can further properly be reinforced while restraining oil from seeping out. The stiffener 140 coupled to the fastening flange 74a can also directly be fixed to the mount device 102 instead of the bracket 100.

In the case of a stiffener 160 of FIG. 10, the reinforcement with the coupling portion D is not necessary as compared to the stiffener 150 so that the coupling at the coupling portion D is omitted, and the stiffener 160 directly fixed to the mount device 102 at the coupling portion G is coupled to the fastening flange 72a of the housing 72 only at the coupling portion E. Also for the stiffeners 120 and 140, the reinforcement with the coupling portion D can be omitted.

Although the examples of the present invention have been described in detail with reference to the drawings, these are merely an embodiment and the present invention can be implemented in variously modified and improved forms based on the knowledge of those skilled in the art.

REFERENCE SIGNS LIST

12: Transaxle (Vehicle drive system unit) 18: Differential gear device 20L, 20R: Front wheels 22: Input shaft (Rotation shaft) 34: Counter driven shaft (Rotation shaft) 42: Output shaft (Rotation shaft) 70: Transaxle case (Unit case) 72: Housing (Fixing case member) 72a, 74a, 74b, 76a: Fastening flange (Abutting portion) 74: Case (Case member) 76: Rear cover (Case member) 90, 92: Fastening bolt 100: Bracket (Supporting member) 102: Mount device (Body-side supporting portion) 120, 140, 150, 160: Stiffener 128: First reinforcing coupling portion 130: Second reinforcing coupling portion

What is claimed is:

1. A support structure of a vehicle drive system unit including a unit case having a plurality of case members provided with abutting portions at axial opening ends, the abutting portions axially abutted against and bolt-fastened to each other to integrally couple the plurality of case members,
   one of the plurality of case members as a fixing case member being fixed via a supporting member to a body-side supporting portion, wherein
   a reinforcing stiffener is disposed on the outside of the unit case so as to couple at least one of the abutting portion of the fixing case member and the abutting portion of another case member abutted against and bolt-fastened to the abutting portion of the fixing case member, and the supporting member or the body-side supporting portion to which the supporting member is fixed.

2. The support structure of a vehicle drive system unit according to claim 1, wherein
   the stiffener includes a first reinforcing coupling portion fixed to the abutting portion as well as a second reinforcing coupling portion fixed to a part of the unit case other than the abutting portions.

3. The support structure of a vehicle drive system unit according to claim 1, wherein
the stiffener is coupled to an abutting portion of the abutting portions that is a fastening flange projected from an opening end of the axial opening ends of one of the case members to an outer circumferential side.

4. The support structure of a vehicle drive system unit according to claim 1, wherein
the stiffener couples the abutting portion of the fixing case member and the supporting member or the body-side supporting portion to which the supporting member is fixed.

5. The support structure of a vehicle drive system unit according to claim 1, wherein
the stiffener couples the abutting portion of the other case member and the supporting member or the body-side supporting portion to which the supporting member is fixed.

6. The support structure of a vehicle drive system unit according to claim 1, wherein
the vehicle drive system unit is a transaxle for a front-drive vehicle including a plurality of rotation shafts arranged in a vehicle width direction and a differential gear device disposed in the unit case to distribute power to right and left front wheels.

* * * * *